L. Lefebvre,
Steam-Boiler Fire-Tube.
No. 1,065. Reissued Oct. 16, 1860.
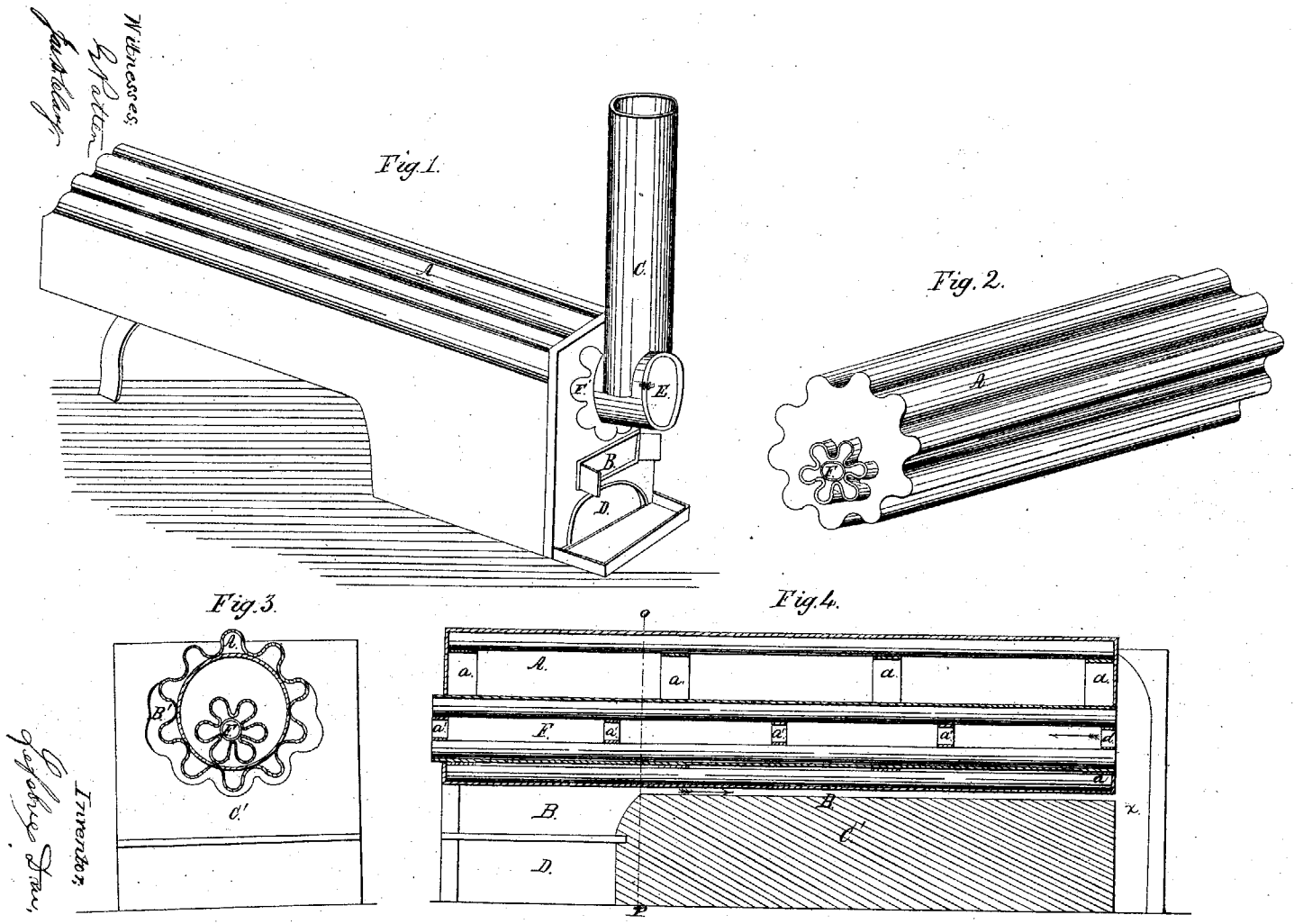
AM. PHOTO-LITHO. CO. N.Y. (OSBORNE'S PROCESS.)

UNITED STATES PATENT OFFICE.

LOUIS LEFEBVRE, OF NEW ORLEANS, LOUISIANA.

IMPROVEMENT IN STEAM-BOILERS.

Specification forming part of Letters Patent No. 23,848, dated May 3, 1859; Reissue No. 1,065, dated October 16, 1860.

*To all whom it may concern:*

Be it known that I, L. LEFEBVRE, of New Orleans, Louisiana, formerly of Donaldsonville, in the county of Ascension and State of Louisiana, have invented a new and useful Improvement in Steam-Boilers; and I do hereby declare that the following is a full, clear, and exact description of the same, reference being had to the annexed drawings, forming part of this specification, in the several figures of which similar characters of reference denote the same parts.

Figure 1 is a perspective view of boiler and furnace. Fig. 2 is a perspective view of boiler, showing projecting flue F. Fig. 3 is a cross-section of boiler and furnace, showing exterior flue, B, section taken on O P, Fig. 4. Fig. 4 is a longitudinal section of boiler and furnace.

The several parts of boiler and furnace are represented as follows: A is a boiler fluted longitudinally; B, furnace; B′, flue running under and around lower portion of boiler, and made to conform to the fluting of the boiler; C, chimney; C′, brick-work; D, ash-pit; E, door giving access to flue; F′, front of boiler; F, flue running through boiler and fluted longitudinally; *a a*, braces placed at intervals in boiler for strengthening the same; *a′ a′*, braces in flue F for giving strength.

The nature of my invention consists in the construction of boiler by fluting both boiler and flue longitudinally, and strengthening the same with hoop braces, placed at intervals, and in combining this construction of boiler with a corrugated or fluted surface of exterior flue, whereby the products of combustion are brought into intimate connection with all parts of the fire-surface.

The fluting of boiler and flue gives an increased fire-surface, kept in form and sustained by the bands *a a′*. The undulating surface of the bottom of flue B′, conforming as it does with the flutes of the boiler, causes the hollow portions of the fire-surface to be heated as much as the projections.

I do not claim the corrugation of boiler-plate, broadly considered, as such is not my invention, but

I claim—

1. The longitudinally-fluted boiler, braced as described.

2. In combination with this construction of boiler, the conformable under surface of the exterior flue, B′, operating as described.

3. The longitudinally-fluted flue, as described.

In testimony whereof I have hereunto signed my name before two subscribing witnesses.

L. LEFEBVRE.

Witnesses:

GEO. PATTEN,

JOHN S. HOLLINGSHEAD.